United States Patent [19]

Sims

[11] Patent Number: 4,889,378
[45] Date of Patent: Dec. 26, 1989

[54] PICKUP TRUCK TAILGATE ACCESSORY

[76] Inventor: Ernest E. Sims, 1002 Edgewood St., Bryan, Tex. 77802

[21] Appl. No.: 215,028

[22] Filed: Jul. 5, 1988

[51] Int. Cl.⁴ ............................................. B62D 25/00
[52] U.S. Cl. .................................................... 296/57.1
[58] Field of Search ........................... 296/57.1, 50, 61

[56] References Cited

U.S. PATENT DOCUMENTS

| | | | |
|---|---|---|---|
| 4,029,355 | 6/1977 | Wilhelmsen | 296/57.1 |
| 4,171,844 | 10/1979 | Landaal et al. | 296/57.1 |
| 4,531,773 | 7/1985 | Smith | 296/57.1 |
| 4,778,213 | 10/1988 | Palmer | 296/57.1 |

Primary Examiner—Robert R. Song
Attorney, Agent, or Firm—Harold H. Dutton, Jr.

[57] ABSTRACT

An accessory for attachment to the tailgate of a pickup truck comprising a panel member of about the same width as the tailgate, and of a height at least about half that of the tailgate, a pair of hinge brackets secured to the tailgate near the sides thereof, bracket secured to the panel member and including a hinge pin secured to the bracket and extending into an aperture in the hinge bracket, a pair of latch apertures in the hinge bracket, a latch bracket secured to the bracket, and a latch pin laterally movable in the latch bracket between a latching position wherein the latch pin extends into one of the latch apertures and a release position wherein the latch pin is retracted from the latch aperture, whereby in the release position, the panel member may pivot about the hinge pins between a first position parallel to the tailgate and a second position substantially perpendicular to the tailgate, so that the accessory serves as an extended stop for long lengths of cargo or as a protector for the top of the tailgate according to the desired arrangement of the accessory.

6 Claims, 2 Drawing Sheets

PICKUP TRUCK TAILGATE ACCESSORY

This invention relates to an accessory for use with the tailgate of a pickup truck. More particularly, the invention relates to a tailgate accessory which increases the versatility of a conventional pickup truck bed.

BACKGROUND AND OBJECTS OF THE INVENTION

For a number of years, pickup trucks have been increasing in popularity as family vehicles which also double for numerous household chores which cannot be accommodated by conventional automobiles. With such increasing use, the pickup truck has been called upon to perform more and more duties beyond merely hauling what can be placed in the bed of the truck. Simultaneously, smaller trucks have also become increasingly popular, yet they are still often called upon to perform the same hauling tasks as the full size pickups.

Of course such trucks continue to be the mainstay of many commercial truck users for hauling or carrying a large variety of materials such as sand, gravel, dimension lumber, full sheets of plywood, ladders, tractors and the like, in addition to the family groceries. Thus, the pickup truck is being used as a very versatile vehicle for a great many purposes.

Notwithstanding their versatility, pickup trucks still have certain limitations in terms of the tasks which they can perform safely and conveniently. For example, the full size trucks generally have a maximum bed length of eight feet, yet often they are used to carry larger lumber by leaving the tailgate down. When the tailgate is left down, however, the lumber is usually not restrained and can fall out of the bed while driving down the highway.

Alternatively, the tailgate is left up and the lumber is rested on top of the tailgate and extends beyond the rear of the truck. In this latter case, the lumber, ladders or other cargo is at a downward angle toward the front of the truck which helps to keep the cargo in place, but the cargo then will often scratch the finish on top of the tailgate, detracting from the appearance of the truck.

In the past, a variety of devices have been developed for overcoming some of the foregoing problems, but generally the prior devices have only overcome one problem, and in so doing frequently introduce other problems.

For example, U. S. Pat. No. 4,472,639 which issued Sept. 18, 1984 to B. E. Bianchi discloses a device in the nature of a collapsible box attached to the truck tailgate for extending the load length of a pickup truck by opening the tailgate and unfolding the box structure. However, the use of long "piano" hinges attaching the structure to the tailgate, together with the overlapping side panels, tends to create a bulky structure when in the closed position, and with inadequate latching means for securing in position. Further, such a device is relatively expensive to produce.

Another device is disclosed in U. S. Pat. No. 4,389,067 which issued on June 21, 1983 to A. J. Rubio. This device is clipped over the top of a tailgate and includes support posts which rest on the bed of the truck. The cross bar is positioned slightly above the top of the tailgate so that objects longer than the bed rest on the crossbar, rather than the top of the tailgate, to protect the finish on the tailgate. While the device does protect the top of the tailgate, it must be removed when the tailgate is opened.

Accordingly, a primary object of this invention is to provide an improved tailgate accessory which increases the versatility of the truck bed.

Another object of the invention is to provide a tailgate accessory which is secured in an out-of-the-way position when not in use.

A further object of the invention is to provide a tailgate accessory which protects the top of the tailgate from damage by long object carried in the bed of the truck when the tailgate is closed.

Yet another object of the invention is to provide a tailgate accessory which extends the useable length of the truck bed.

Still another object of the invention is to provide a tailgate accessory which may be used to cause very long objects to lie at a downward angle toward the front of the bed when the tailgate is open.

Yet a further object of the invention is to provide a tailgate accessory which may be easily collapsed when not in use and secured in an unobtrusive position.

These and other objects of the invention will become apparent from a detailed consideration of the specification and claims which follow, when taken together with the accompanying drawings.

DESCRIPTION OF THE INVENTION

The tailgate accessory of this invention comprises a panel substantially the same width as the tailgate, and of a height at least about half of the height of the tailgate, and up to almost the same height as the tailgate. The panel is hingedly attached to the side edges of the tailgate by a pair of hinge plates bolted or otherwise fastened to the sides of the tailgate and having hinge pins extending into angle brackets which also reinforce the panel.

In one embodiment, latch pins are provided offset from the hinge pins, to secure the panel in position. Alternatively, since the panel is not usually subjected to great force tending to move the panel to a closed position, a variety of other means may be used to secure the panel in its "open" position.

The panel may be pivoted about the hinge pins between a closed position, in which the panel is substantially parallel to and overlying the tailgate, and an open position in which the panel is at substantially a right angle to the tailgate.

In the closed position, the hinged edge of the panel projects slightly from the plane of the tailgate so as to become a support for long objects placed in the truck when the tailgate is closed and thereby protect the finish on the tailgate. Again, when the panel is in the closed position, and the tailgate is open, long objects placed in the bed of the truck rest upon the panel which causes the objects to be angled downwardly toward the front of the truck, helping to retain the objects in the truck.

When the tailgate is open and the panel is pivoted to the open position, the panel projects upwardly from the tailgate, so that the effective length of the pickup bed is increased by the width of the tailgate, while the panel still provides a stop to prevent long objects from falling out of the rear of the bed.

In a preferred embodiment, a latch mechanism is secured to the panel, or to angle reinforcing brackets at the ends of the panel, and a latch pin is provided to project into predrilled holes in the hinge plates for securing the panel in either the open or closed position. The latch pins may be spring biased toward the holes in the hinge plates, so that as the panel is raised toward its open position, the pins will automatically enter the holes when the proper position of the panel is reached.

BRIEF DESCRIPTION OF THE DRAWINGS

The invention will now be described in greater detail with reference to the accompanying sheets of drawings in which.

DESCRIPTION OF PREFERRED EMBODIMENTS

Figure 1:
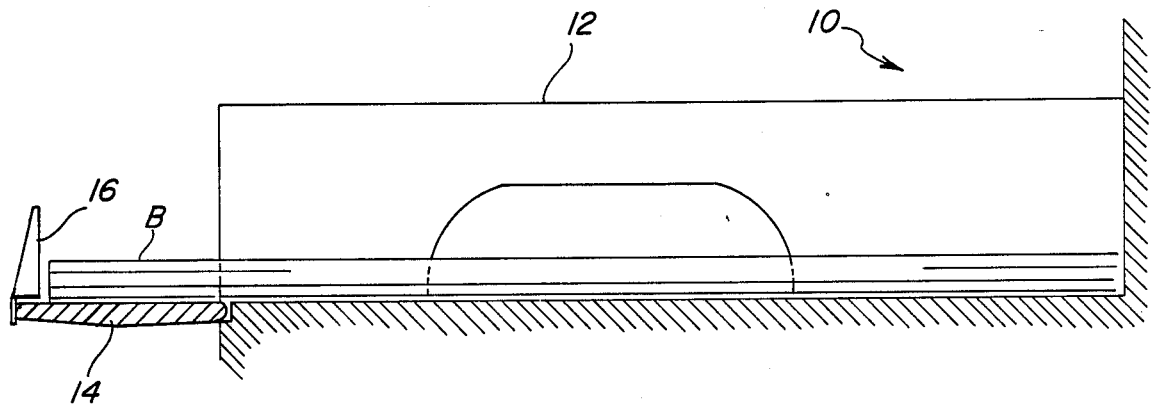
FIG. 1 is a fragmentary side elevational view of the accessory according to the present invention with the tailgate and the accessory in open positions.
Figure 2:
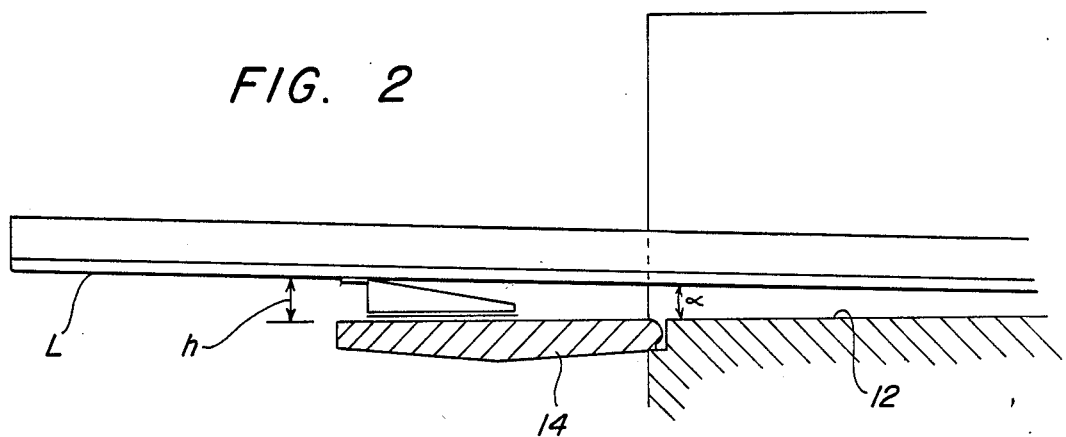
FIG. 2 is an enlarged fragmentary similar to FIG. 1 with the tailgate in an open position and the accessory panel in a closed position.
Figure 3:
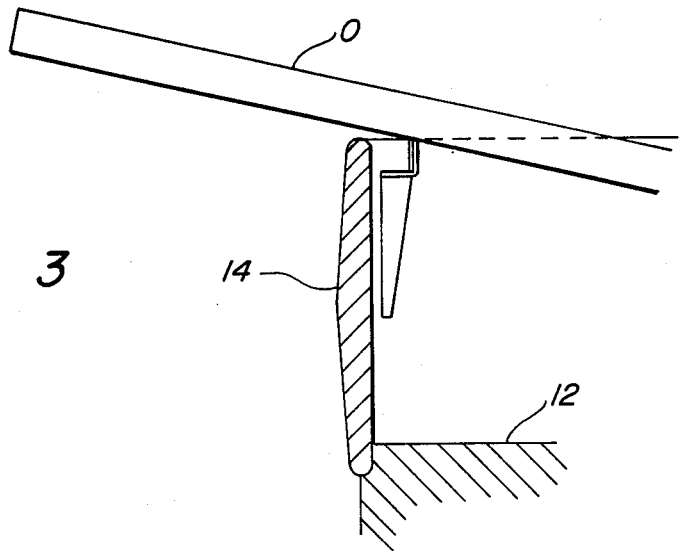
FIG. 3 is a further enlarged fragmentary view showing the panel and the tailgate in closed positions.

Referring to FIGS. 1-3 of the drawings, a pickup truck generally designated 10 is seen to include a conventional bed 12 with a tailgate 14 hingedly connected to the truck in the usual manner. The tailgate accessory is shown at 16. In FIG. 1, the tailgate 14 is open, and the accessory 16 of the invention is also shown in its open position, where it projects upwardly at substantially a right angle to the tailgate. In this position, the accessory 16 serves as an abutment for long boards "B" or the like in the truck bed, to prevent the boards from falling out of the rear of the truck.

In FIG. 2, the tailgate 14 is still open, but now the accessory 16 has been folded to its "closed" position. In this position, the accessory 16 projects upwardly from the surface of the tailgate a distance 'h'. This arrangement permits the long object, e.g. a ladder 'L' to extend beyond the end of the tailgate and to be at a slight downward angle α which is generally adequate to keep the object in the truck without danger that it will fall out.

FIG. 3 shows the tailgate 14 and the accessory panel 16 both in the closed position, in which case the panel still projects (now forwardly) from the tailgate, so that a long object 'O' placed in the bed of the truck will rest on the panel 16 instead of the tailgate itself, so that the tailgate will not be scratched by the object.

Figure 4:
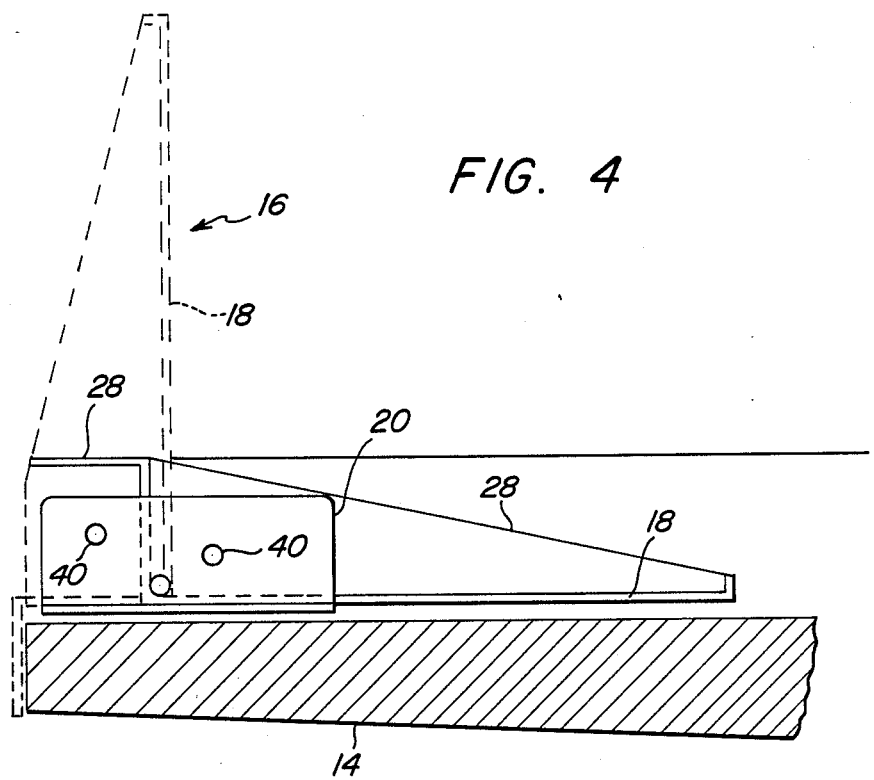
FIG. 4 is an enlarged detail view showing the panel in a closed position, and in an open position in dotted lines.
Figure 5:
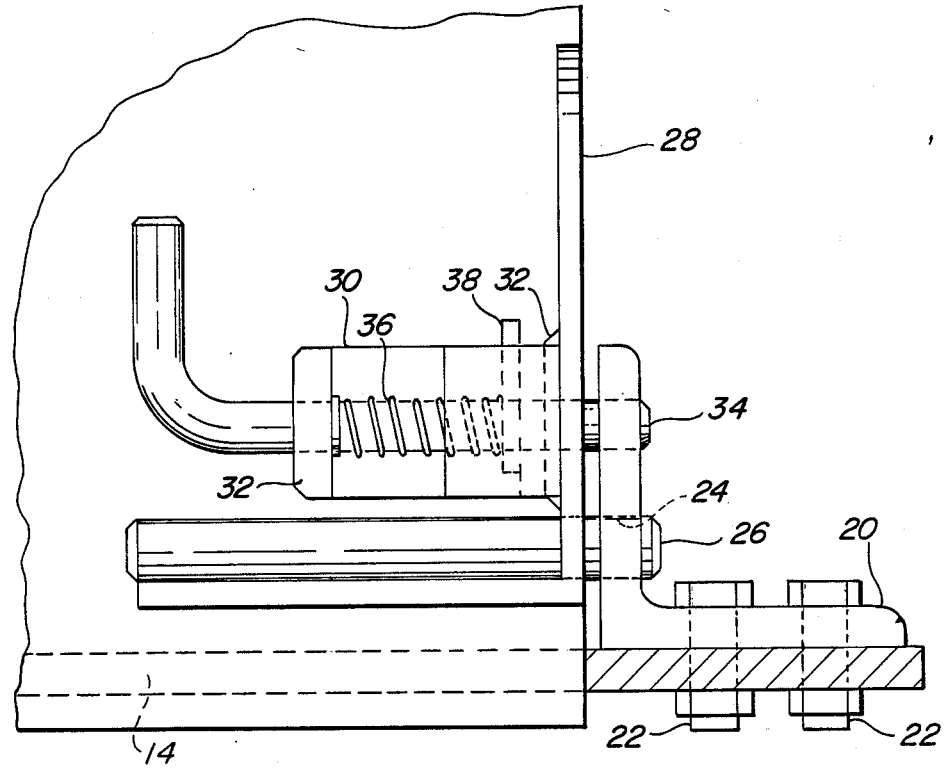
FIG. 5 is a plan view of the hinge and latch mechanism.

Referring now to FIGS. 4 and 5, the accessory is seen to include a panel 18 which is substantially planar and of the same width as the tailgate 14. A pair of hinge brackets 20 are secured to opposite sides of the tailgate near the top thereof by any appropriate fastening means, such as the bolts 22. The hinge brackets 20 are each provided with a hinge pin hole 24 which receives a hinge pin 26.

An angle bracket 28 is secured to the panel 18 as by welding, and the hinge pin 26 is welded to one leg of the bracket 28 and extends through a hole in the other leg of bracket 28 and then enters the hole 24 in the bracket 20. In this manner the panel 18 and the bracket 28 may pivot about the hinge pin 26 between the solid line and the dotted line positions shown in FIG. 4.

A fastener bracket 30 is secured to the bracket 20 by welding, for example. The bracket 30 includes a pair of upstanding legs 32 having aligned apertures (not shown) for receiving a latch pin 34. A coil spring 36 surrounds the latch pin 34 between the legs 32 and abuts a stop 38 fixed to the pin 34. Thus, the spring urges the pin 34 to the right as seen in FIG. 5, into one of two or more latching apertures in the hinge bracket 20. The latching apertures are seen at 40 in FIG. 4, and their positions are determined such as to fasten the accessory either perpendicularly to, or parallel to, the plane of the tailgate.

When it is desired to change the position of the accessory, the user simply pulls on the latch pin 34 to withdraw it from the aperture 40, and the panel is free to pivot about the hinge pin 26. When released, and when the panel is pivoted to the other position, the latch pin will be forced into the latching hole 40 by the spring 36, securely holding the panel in place. This latching arrangement has been found to be very simple to use, and yet to hold the panel securely in the desired position.

Preferably, the panel will be made of brushed aluminum so as to enhance the appearance of the rear of the truck, when the tailgate is open and the panel is in its open position. Of course any variety of indicia, such as trademarks for the product or the vehicle may be printed or stamped on the panel, if desired.

While the invention has been described as having certain preferred features and embodiments, it will be understood that it is capable of still further variation and modification, without departing from the spirit of the invention, and this application is intended to cover any and all variations, modifications and adaptations of the invention as fall within the spirit of the invention and the scope of the appended claims.

I claim:

1. An accessory for attachment to the tailgate of a pickup truck comprising a panel member of about the same width as the tailgate, and of a height at least about half that of the tailgate, a pair of hinge brackets secured to the rear end portion of the tailgate near the sides thereof, bracket means secured to said panel member and including a hinge pin secured to said bracket means and extending into an aperture in said hinge bracket, a pair of latch apertures in said hinge bracket, a latch bracket secured to said bracket means, and a latch pin laterally movable in said latch bracket between a latching position wherein said latch pin extends into one of said latch apertures and a release position wherein said latch pin is retracted from said latch aperture, whereby in said release position, said panel member may pivot about said hinge pins between a first position parallel to said tailgate and a second position substantially perpendicular to said tailgate.

2. An accessory as in claim 1 and wherein said latch pin is spring biased toward latching position.

3. An accessory as in claim 1 and wherein said hinge bracket comprises an angle bracket.

4. An accessory as in claim 1 and wherein said latch bracket comprises a pair of legs having aligned apertures, said latch pin being positioned in said aligned apertures, and including a spring member between said legs surrounding said latch pin.

5. An accessory as in claim 4 and wherein said hinge pin is secured to said bracket means.

6. An accessory as in claim 5 and wherein said bracket means extends substantially the full height of said panel member.

* * * * *